US008971628B2

(12) United States Patent
Susanu et al.

(10) Patent No.: US 8,971,628 B2
(45) Date of Patent: Mar. 3, 2015

(54) FACE DETECTION USING DIVISION-GENERATED HAAR-LIKE FEATURES FOR ILLUMINATION INVARIANCE

(75) Inventors: George Susanu, Headford (IE); Dan Filip, Bucuresti (RO); Mihnea Gangea, Bucuresti (RO)

(73) Assignee: FotoNation Limited, Ballybrit, Galway (IE)

( * ) Notice: Subject to any disclaimer, the term of this patent is extended or adjusted under 35 U.S.C. 154(b) by 580 days.

(21) Appl. No.: 12/843,805

(22) Filed: Jul. 26, 2010

(65) Prior Publication Data

US 2012/0019683 A1 Jan. 26, 2012

(51) Int. Cl.
*G06K 9/00* (2006.01)
*G06K 9/46* (2006.01)

(52) U.S. Cl.
CPC .......... *G06K 9/00228* (2013.01); *G06K 9/4642* (2013.01)
USPC ........................................... 382/181; 382/118

(58) Field of Classification Search
CPC .................... G06K 9/00221–9/00281
USPC .................................................. 382/181, 118
See application file for complete search history.

(56) References Cited

U.S. PATENT DOCUMENTS

| 4,299,464 A | 11/1981 | Cushman |
| 4,448,510 A | 5/1984 | Murakoshi et al. |
| 5,432,863 A | 7/1995 | Benati et al. |
| 5,550,671 A | 8/1996 | Andersson et al. |
| 5,748,764 A | 5/1998 | Benati et al. |
| 5,751,836 A | 5/1998 | Wildes et al. |

(Continued)

FOREIGN PATENT DOCUMENTS

| EP | 1128316 A1 | 8/2001 |
| EP | 1296510 A2 | 3/2003 |

(Continued)

OTHER PUBLICATIONS

Jacob Whitehill et al, Haar Features for FACS AU Recognition, IEEE 2006.*

(Continued)

*Primary Examiner* — Jayesh A Patel
*Assistant Examiner* — Mark Roz
(74) *Attorney, Agent, or Firm* — Hickman Palermo Truong Becker Bingham Wong LLP

(57) ABSTRACT

Faces in images are quickly detected with minimal memory resource usage. Instead of calculating a Haar-like feature value by subtracting the average pixel intensity value in one rectangular region from the average pixel intensity value in another, adjacent rectangular region, a face-detection system calculates that Haar-like feature value by dividing the average pixel intensity value in one such rectangular region by the average pixel intensity value in the other such adjacent rectangular region. Thus, each Haar-like value is calculated as a ratio of average pixel intensity values rather than as a difference between such average pixel intensity values. The feature values are calculated using this ratio-based technique both during the machine-learning procedure, in which the numerical ranges for features in known face-containing images are learned based on labeled training data, and during the classifier-applying procedure, in which an unlabeled image's feature values are calculated and compared to the previously machine-learned numerical ranges.

28 Claims, 4 Drawing Sheets

(56) References Cited

U.S. PATENT DOCUMENTS

| | | |
|---|---|---|
| 5,802,220 A | 9/1998 | Black et al. |
| 5,805,720 A | 9/1998 | Suenaga et al. |
| 6,072,903 A | 6/2000 | Maki et al. |
| 6,198,505 B1 | 3/2001 | Turner et al. |
| 6,246,790 B1 | 6/2001 | Huang et al. |
| 6,278,491 B1 | 8/2001 | Wang et al. |
| 6,335,990 B1 | 1/2002 | Chen et al. |
| 6,407,777 B1 | 6/2002 | DeLuca |
| 6,456,737 B1 | 9/2002 | Woodfill et al. |
| 6,636,694 B1 | 10/2003 | Misumi et al. |
| 6,661,907 B2 | 12/2003 | Ho et al. |
| 6,747,690 B2 | 6/2004 | Molgaard |
| 6,823,086 B1 | 11/2004 | Dolazza |
| 6,895,112 B2 | 5/2005 | Chen et al. |
| 7,072,525 B1 | 7/2006 | Covell |
| 7,099,510 B2 | 8/2006 | Jones et al. |
| 7,130,453 B2 | 10/2006 | Kondo et al. |
| 7,176,975 B2 | 2/2007 | Matsunaga et al. |
| 7,315,631 B1 | 1/2008 | Corcoran et al. |
| 7,352,394 B1 | 4/2008 | DeLuca et al. |
| 7,403,643 B2 | 7/2008 | Lanculescu et al. |
| 7,403,654 B2 | 7/2008 | Wu et al. |
| 7,551,755 B1 | 6/2009 | Steinberg et al. |
| 7,567,707 B2 | 7/2009 | Willamowski |
| 7,630,006 B2 | 12/2009 | DeLuca et al. |
| 7,692,696 B2 | 4/2010 | Steinberg et al. |
| 7,783,085 B2 | 8/2010 | Perlmutter et al. |
| 7,804,983 B2 | 9/2010 | Steinberg et al. |
| 7,903,870 B1 | 3/2011 | Budagavi |
| 7,995,239 B2 | 8/2011 | Yonaha |
| 7,995,855 B2 | 8/2011 | Albu et al. |
| 8,005,268 B2 | 8/2011 | Steinberg et al. |
| 8,155,468 B2 | 4/2012 | Albu et al. |
| 8,212,897 B2 | 7/2012 | Steinberg et al. |
| 8,254,674 B2 | 8/2012 | Nanu et al. |
| 8,265,348 B2 | 9/2012 | Steinberg et al. |
| 8,265,388 B2 | 9/2012 | Nanu et al. |
| 2001/0012063 A1 | 8/2001 | Maeda |
| 2001/0038714 A1 | 11/2001 | Masumoto et al. |
| 2002/0034337 A1 | 3/2002 | Shekter |
| 2002/0080261 A1 | 6/2002 | Kitamura et al. |
| 2002/0102024 A1 | 8/2002 | Jones et al. |
| 2002/0136450 A1 | 9/2002 | Chen et al. |
| 2002/0154793 A1 | 10/2002 | Hillhouse et al. |
| 2003/0044070 A1 | 3/2003 | Fuersich et al. |
| 2003/0071908 A1 | 4/2003 | Sannoh et al. |
| 2003/0086134 A1 | 5/2003 | Enomoto |
| 2003/0095197 A1 | 5/2003 | Wheeler et al. |
| 2003/0118218 A1 | 6/2003 | Wendt et al. |
| 2003/0138143 A1 | 7/2003 | Noguchi |
| 2003/0184671 A1 | 10/2003 | Robins et al. |
| 2004/0042659 A1 | 3/2004 | Guo et al. |
| 2004/0213478 A1 | 10/2004 | Chesnokov |
| 2004/0264780 A1 | 12/2004 | Zhang et al. |
| 2005/0013506 A1 | 1/2005 | Yano |
| 2005/0147304 A1 | 7/2005 | Nagahashi et al. |
| 2005/0226484 A1 | 10/2005 | Basu et al. |
| 2005/0226509 A1 | 10/2005 | Maurer et al. |
| 2005/0249416 A1 | 11/2005 | Leue et al. |
| 2005/0259185 A1 | 11/2005 | Kim et al. |
| 2006/0039690 A1 | 2/2006 | Steinberg et al. |
| 2006/0072815 A1 | 4/2006 | Wu et al. |
| 2006/0110014 A1 | 5/2006 | Philomin et al. |
| 2006/0204052 A1 | 9/2006 | Yokouchi |
| 2006/0257047 A1 | 11/2006 | Kameyama et al. |
| 2006/0269270 A1 | 11/2006 | Yoda et al. |
| 2006/0280380 A1 | 12/2006 | Li |
| 2006/0285754 A1 | 12/2006 | Steinberg et al. |
| 2006/0291739 A1 | 12/2006 | Li et al. |
| 2007/0036429 A1 | 2/2007 | Terakawa |
| 2007/0147820 A1 | 6/2007 | Steinberg et al. |
| 2007/0172126 A1 | 7/2007 | Kitamura |
| 2007/0177817 A1 | 8/2007 | Szeliski et al. |
| 2007/0189609 A1 | 8/2007 | Ito et al. |
| 2007/0195996 A1 | 8/2007 | Kitamura |
| 2007/0196019 A1 | 8/2007 | Yamaguchi |
| 2007/0216777 A1 | 9/2007 | Quan et al. |
| 2007/0263119 A1 | 11/2007 | Shum et al. |
| 2007/0263928 A1 | 11/2007 | Akahori |
| 2007/0269108 A1 | 11/2007 | Steinberg et al. |
| 2008/0025576 A1 | 1/2008 | Li et al. |
| 2008/0112599 A1 | 5/2008 | Nanu et al. |
| 2008/0205712 A1 | 8/2008 | Ionita et al. |
| 2008/0219517 A1 | 9/2008 | Blonk et al. |
| 2008/0253651 A1 | 10/2008 | Sagawa |
| 2008/0309617 A1 | 12/2008 | Kong et al. |
| 2008/0310759 A1 | 12/2008 | Liu et al. |
| 2009/0080795 A1 | 3/2009 | Yano |
| 2009/0087099 A1 | 4/2009 | Nakamura |
| 2009/0185753 A1 | 7/2009 | Albu et al. |
| 2009/0190803 A1 | 7/2009 | Neghina et al. |
| 2009/0297044 A1 | 12/2009 | Kokumai et al. |
| 2009/0303342 A1 | 12/2009 | Corcoran et al. |
| 2010/0053362 A1 | 3/2010 | Nanu et al. |
| 2010/0053367 A1 | 3/2010 | Nanu et al. |
| 2010/0053368 A1 | 3/2010 | Nanu et al. |
| 2010/0054592 A1 | 3/2010 | Nanu et al. |
| 2011/0044524 A1 | 2/2011 | Wang et al. |
| 2011/0044553 A1 | 2/2011 | Coupe et al. |
| 2011/0058060 A1 | 3/2011 | Bigioi et al. |
| 2011/0102643 A1 | 5/2011 | Nanu et al. |
| 2011/0105194 A1 | 5/2011 | Wang et al. |
| 2011/0158547 A1 | 6/2011 | Petrescu |
| 2011/0279700 A1 | 11/2011 | Steinberg et al. |
| 2012/0014600 A1 | 1/2012 | Nanu et al. |
| 2012/0019683 A1 | 1/2012 | Susanu |
| 2012/0083294 A1 | 4/2012 | Bray et al. |

FOREIGN PATENT DOCUMENTS

| | | |
|---|---|---|
| EP | 1748378 A1 | 1/2007 |
| EP | 1 858 255 A1 | 11/2007 |
| EP | 1839435 B1 | 4/2009 |
| EP | 2158754 A1 | 3/2010 |
| EP | 2249556 A2 | 9/2011 |
| EP | 2249556 A3 | 9/2011 |
| JP | H 10-233929 A | 9/1998 |
| JP | 2000/305141 A | 11/2000 |
| JP | 2001/216518 A | 8/2001 |
| JP | 2001/283224 A | 10/2001 |
| JP | 2003/018398 A | 1/2003 |
| JP | 2003111041 | 4/2003 |
| JP | 2003/179807 A | 6/2003 |
| JP | 2003/187233 A | 7/2003 |
| JP | 2003/27471 A | 9/2003 |
| JP | 2004/023518 A | 1/2004 |
| JP | 2004005694 | 1/2004 |
| JP | 2005/078158 A | 3/2005 |
| JP | 2005/164475 A | 6/2005 |
| JP | 2005/165984 A | 6/2005 |
| JP | 2005208760 | 8/2005 |
| JP | 2006/072770 A | 3/2006 |
| JP | 2006/259974 A | 9/2006 |
| JP | 2006/318103 A | 11/2006 |
| JP | 2006/319534 A | 11/2006 |
| JP | 2006/319870 A | 11/2006 |
| JP | 2006/350498 A | 12/2006 |
| JP | 2007/047965 A | 2/2007 |
| JP | 2007/241424 A | 9/2007 |
| JP | 2007/006182 A | 11/2007 |
| JP | 2008/005081 A | 1/2008 |
| KR | 10-2004-0034342 A | 4/2004 |
| KR | 10-2005-0041772 A | 5/2005 |
| KR | 10-2006-0003666 A | 1/2006 |
| WO | WO 94/26057 A | 11/1994 |
| WO | WO 2007/073781 A1 | 7/2005 |
| WO | WO2005076217 A2 | 8/2005 |
| WO | WO2006/095860 A | 9/2006 |
| WO | WO 2007/060980 A1 | 5/2007 |
| WO | WO 2007/09777 A1 | 8/2007 |
| WO | WO 2007/106117 A2 | 9/2007 |
| WO | WO 2007/106117 A3 | 12/2007 |
| WO | WO 2008/104549 A2 | 9/2008 |
| WO | WO2008/107112 A2 | 9/2008 |

(56) References Cited

FOREIGN PATENT DOCUMENTS

| | | |
|---|---|---|
| WO | WO2008/107112 A3 | 9/2008 |
| WO | WO 2008/104549 A3 | 10/2008 |
| WO | WO 2009/089847 A1 | 7/2009 |
| WO | WO 2010/025908 A1 | 3/2010 |
| WO | WO 2010/136593 A2 | 12/2010 |
| WO | WO 2011/000841 | 1/2011 |
| WO | WO 2010/136593 A3 | 2/2011 |
| WO | WO 2012/041892 A1 | 4/2012 |

OTHER PUBLICATIONS

Feng Tang, Representing Images Using Nonorthogonal Haar-Like Bases, IEEE 2007.*
Wikipedia, Haar-like features, 2013.*
Paul Viola and Michael Jones, Rapid Object Detection using a Boosted Cascade of Simple Features, IEEE 2001.*
Pawan Sinha, "Qualitative Representations for Recognition", BMCV 2002.*
Oxford English Dictionary, definition of "Arithmetical Ratio", OED Third Edition, Mar. 2012.*
Douglas M. Jessephh, "Squaring the Circle", 1999.*
Sinha et al, "Qualitative Representations for Recognition", BMCV 2002.*
Viola et al, Rapid Object Detection using a Boosted Cascade of Simple Features, IEEE 2001.*
Viola, Paul, et al., "Rapid Object Detection using a Boosted Cascade of Simple Features", IEEE, 2001, 8 pages.
Viola, Paul, et al., "Robust Real-Time Face Detection", International Journal of Computer Vision, 18 pages; vol. 57: Issue 2, May 2004.
Japanese Office Action received in International Application No. 512405/2012 dated Jun. 25, 2013 (7 pages).
Japanese Current Claims of 512405/2012 dated Jun. 2013 (9 pages).
Japanese Office Action received in International Application No. 2012-516781 dated Jun. 18, 2013 (4 pages).
Japanese Current Claims of 2012-516781dated Jun. 2013 (4 pages).
Sun, J. et al., "Flash Matting" *2006 ACM* (pp. 772-778).
Tang et al., "Representing Images Using Nonorthogonal Haar-Like Bases", IEEE, vol. 29, No. 12, dated Dec. 2007, 15 pages.
Wikipedia, "Haar-like features", http://en.wikipedia.org/wiki/Haar-like_features, last accessed on Aug. 11, 2013, 1 page.
Whitehill et al., "Haar Features for FACS AU Recognition" IEEE, dated 2006, 5 pages.
Patent Application which claims priority to 60/773,714 filed Feb. 14, 2006 (24 pages).
International Searching Authority, "Search Report and Written Opinion", in application No. PCT/EP2010/057492, dated Nov. 19, 2010, 21 pages.
Current Claims in application No. PCT/EP2010/057492, dated Nov. 2010, 11 pages.
International Searching Authority, "Search Report and Written Opinion", in application No. PCT/EP2010/059228, dated Nov. 19, 2010, 19 pages.
Current Claims in application No. PCT/EP2010/059228, dated Nov. 2010, 8 pages.
Harguess et al., "A Case for the Average-Half-face in 2D and 3D for Face Recognition", IEEE, dated 2009, 6 pages.
Saatci et al., Cascaded Classification of Gender and Facial Expression Using Active Appearance Models, dated 2006, IEEE, 6 pages.
Michael Braun & Georg Petschnigg: "Information fusion of Flash and Non-Flash Images." Internet Citation, (online), Dec. 31, 2002, XP002398967, Retrieved from the Internet: URL:http://graphics.stanford.edu/(georgp/vision.htm> [retrieved on Sep. 14, 2006] Section Overview, Section Object Cutout.
Scott Kelby, "Photoshop Elements 3: Down & Dirty Tricks —Chapter 1. One Hour Photo: Portrait and Studio Effects", http://proquest.safaribooksonline.com/o321278356/ch01, Dec. 27, 2004, PEACHIT Press, XP002406719, ISBN: 0-321-27835-6, 6 pages.
Morgan McGuire and Wojciech Matusick and Hanspeter Pfsiter and John F. Hughes and Fredo Durand: "Defocus video matting" Siggraph 2005 (Online) Jul. 31, 2005, XP002406140, Retrieved from the Internet: URL: http://www.cs.brown.edu/people/morgan/DefocusVideoMatting/mcg05-DefocusVideoMatting. pdf> (retrieved on Nov. 7, 2006], 10 pages.
Scott Kelby, "The Photoshop Elements 4 Book for Digital Photographers—Section: Tagging Images of People (Face Tagging)", New Riders, XP002406720, ISBN: 0-321-38483-0, http://proquest.safaribooksonline.com/0321384830/ch01lev1sec12?displayrbooks=0, Nov. 14, 2005, 4 pages.
Irene Kotsia, Ioannis Pitas: Facial Expression Recognition in Image Sequences Using Geometric Deformation Features and Support Vector Machines, IEEE Transactions on Image Processing, vol. 16, No. 1, Jan. 1, 2007. pp. 172-187.
Buenaposada J M, Munoz E, Baumela L, Efficiently estimating facial expression and illumination in appearance-based tracking, Proceedings of the British Machine Vision Conference, Sep. 1, 2006, Page(s):1-10, XP002494036.
Li and A K Jain (EDS) S, Handbook of face recognition, Modeling Facial Shape and Appearance, Handbook of Face Recognition, Jan. 1, 2005 Springer, New York, US, Page(s):39-63, XP002494037.
Romdhani S, et al., Identification by Fitting a 3D Morphable Model using linear Shape and Texture Error Functions, European Conference on Computer Vision, Jan. 1, 2002; Berlin, DE, Page(s):1-15, XP003018283.
A. Zandifar, S.-N. Lim, R. Duraiswami, N. A. Gumerov, and L S. Davis, "Multi-level fast multipole method for thin plate spline evaluation." in ICIP, 2004, pp. 1683-1686.
Belle V., "Detection and Recognition of Human Faces using Random Forests for a Mobile Robot" [Online] Apr. 2008, pp. 1-104, RWTH Aachen, DE Master of Science Thesis, [retrieved on Apr. 29, 2010], Retrieved from the Internet: URL:http://thomas.deselaers.de/teaching/fi les/belle_master.pdf> Section 5.7 Chapters 3-5, XP002579603.
Sinjini Mitra, Marios Savvides: "Gaussian Mixture Models Based on the Frequency Spectra for Human Identification and Illumination Classification", Automatic Identification Advanced Technologies, 2005. Fourth IEEE Work Shop on Buffalo, NY, USA Oct. 17-18, 2005, Piscataway, NJ, USA, IEEE, Oct. 17, 2005, pp. 245-250, XP010856528 ISBN: 978-0-7695-2475-7.
A. Z. Kouzani: "Illumination-effects compensation in facial images", Systems, Man, and Cybernetics, 1999. IEEE SMC '99 Conference Proceedings. 1999 IEEE International Conference on Tokyo, Japan Oct. 12-15, 1999, Piscataway, NJ, USA, IEEE, US, vol. 6, Oct. 12, 1999, pp. 840-844, XP010363112 ISBN: 978-0/7803-5731-0 DOI: http://dx.doi.org/10.1109/ICSMC.1999.816661.
Maricor Soriano, Elzbieta Marszalec, J. Birgitta Martinkauppi, Matti Pietikäinen: "Making saturated facial images useful again," Proceedings of the SPIE, SPIE, Bellingham, VA, vol. 3826, Jun. 17, 1999, pp. 113-121, XP002325961 ISSN: 0277-786X DOI: http://dx.doi.org/10.1117/12.364317.
Terence Sim, Simon Baker, and MAAN BSAT: "The CMU Pose, Illumination, and Expression (PIE) database," Automatic Face and Gesture Recognition, 2002. Proceedings. Fifth IEEE International Conference on, IEEE, Piscataway, NJ, USA, May 20, 2002, pp. 53-58, XP010949335 ISBN: 978-0-7695-1602-8.
Gaubatz M, Ulichney R., Automatic red-eye detection and correction, Proceedings / 2002 International Conference on Image Processing: Sep. 22-25, 2002, Rochester, New York, USA, IEEE Operations Center, Piscataway, NJ, vol. 1, Sep. 22, 2002, pp. 804-807, XP010607446 ISBN: 978-0-7803-7622-9.
Chantler et al., Classifying surface texture while simultaneously estimating illumination direction International Journal of Computer Vision, 62(1-2), 83-96. Special Issue on Texture Analysis and Synthesis, 2005.
Zhang Lei, Lin Fuzong, Zhang Bo: A CBIR method based on color-spatial feature, IEEE Region 10th Ann. Int. Conf. 1999 (TENCON'99, Cheju, Korea, 1999). 4 pages.
Georghiades, A. S.; Belhumeur, P.N. &Kriegman, D.J., (2001). From few to many: illumination cone models for face recognition under variable lighting and pose, IEEE Trans. Pattern Anal. Mach. Intelligence, vol. 23, No. 6, pp. 643-660.
Nefian, A.V. & Hayes III, M.H. Hidden Markov Models for Face Recognition, Proc. of the IEEE International Conference on Acous-

(56) References Cited

OTHER PUBLICATIONS tics, Speech, and Signal Processing, ICASSP'98, vol. 5, May 12-15, 1998, Seattle, Washington, USA, pp. 2721-2724.

Ojala, T.; Pietikäinen, M. & Mäenpää, T. A generalized Local Binary Pattern operator for multiresolution gray scale and rotation invariant texture classification, Advances in Pattern Recognition, ICAPR 2001 Proceedings, Springer, 397-406, 2001.

Longbin Chen, Baogang Hu, Lei Zhang, Mingjing Li, Hongjiang Zhang, Face Annotation for Family Photo Album Management, International Journal of Image and Graphics, 2003, pp. 1-14, vol. 3, No. 1. World Scientific Publishing Company.

P. Jonathon Phillips, Patrick J. Flynn, Todd Scruggs, Kevin W. Bowyer, Jin Chang, Kevin Hoffman, Joe Marques, Jaesik Min, William Worek, Overview of the Face Recognition Grand Challenge, Proceedings of the 2005 IEEE Computer Society Conference on Computer Vision and Pattern Recognition (CVPR'05), 8 pages.

Corcoran, P. & Costache, G. (2005). Automated sorting of consumer image collections using face and peripheral region image classifiers, Consumer Electronics, IEEE Transactions on vol. 51, Issue 3, Aug. 2005, pp. 747-754.

Matthew Turk and Alex Pentland: Eigenfaces for Recognition, Journal of Cognitive Neuroscience, 3(1), 1991, pp. 71-86.

H. Lai, P. C. Yuen, and G. C. Feng, Face recognition using holistic Fourier invariant features, Pattern Recognition, 2001, vol. 34, pp. 95-109.

Ronny Tjahyadi, Wanquan Liu, Svetha Venkatesh: Application of the DCT Energy Histogram for Face Recognition, Proceedings of the 2nd International Conference on Information Technology for Application, (ICITA 2004), pp. 305-310.

Tianhorng Chang and C.-C. Jay Kuo: Texture analysis and classification with tree-structured wavelet transform, IEEE Transactions on Image Processing, vol. 2, No. 4, 1993, pp. 429-441.

Markus Stricker and Markus Orengo: Similarity of color images, SPIE Proc., 1995, 12 pages.

Lienhart, R., Liang, L., and Kuranov, A., a Detector Tree of Boosted Classifiers for Real-Time Object Detection and Tracking, Proceedings of the 2003 International Conference on Multimedia and Expo—vol. 1, pp. 277-280 (2003), ISBN:O-7803-7965-9, Publisher IEEE Computer Society, Washington, DC, USA.

Jing Huang, Ravi Kumar, Mandar Mitra, Wei-Jing Zhu, Ramin Zabih. Image Indexing Using Color Correlograms. In 1997 Conference on Computer Vision and Pattern Recognition (CVPR 97), Jun. 17-19, 1997, San Juan, Puerto Rico pp. 762-768, IEEE Computer Society, 1997, pp. 762-768.

S. J. Wan, P. Prusinkiewicz, S. K. M. Wong, Variance-based color image quantization for frame buffer display, Color Research & Application, vol. 15, Issue 1, 1990. pp. 52-58, Copyright® 1990 Wiley Periodicals, Inc., A Wiley Company.

PCT Notification of Transmittal of Copies of International Preliminary Report on Patentability Chapter I (IB/326), including the International Preliminary Report on Patentability (Chapter I of the Patent Cooperation Treaty), for PCT Application No. PCT/EP2010/057492, report dated Nov. 29, 2011, 14 pages.

PCT Notification of Transmittal of the International Search Report and the Written Opinion of the International Searching Authority, or the Declaration, PCT application serial No. PCT/EP2006/007573, filed Jul. 31, 2006, entitled "Digital Image Acquisition System With Portrait Mode, " report dated Nov. 27, 2006, 13 pages.

Japan Patent Office, "Final Decision for Rejection" in application No. 2012-516781, dated Feb. 25, 2014, 3 pages.

Current Claims in application No. 2012-516781, dated Feb. 2014, 5 pages.

Viola, Paul, "Robust Real-Time Face Detection", IEEE, dated 2001, 18 pages.

Pawan, Sinha, "Qualitative Representations for Recognition", BMCV, dated 2002, 14 pages.

Oxford English Dictionary, definition of "Arithmetical Ratio", OED Third Edition, Dated Mar. 2012, 1 page.

Jesseph, Douglas M., "Squaring the Circle", dated 1999, 4 pages.

\* cited by examiner

FACE DETECTION USING DIVISION-GENERATED HAAR-LIKE FEATURES FOR ILLUMINATION INVARIANCE

CROSS-REFERENCE TO RELATED APPLICATIONS

The present application is related to U.S. patent application Ser. No. 12/825,280, which is titled "Methods And Apparatuses For Half-Face Detection," which was filed on Jun. 28, 2010, and whose contents are incorporated by reference herein.

FIELD OF THE INVENTION

The present invention relates generally to digital image processing and more particularly to techniques for face detection and recognition.

BACKGROUND OF THE INVENTION

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

Many existing digital image processing algorithms utilize facial recognition and detection techniques in order to identify human faces in a digital image. Identifying human faces is often a necessary or desired step in various image enhancement and image alteration applications. For example, identifying human faces can be used as a step in algorithms that enhance the separation of a subject in the foreground from the background in order to enhance depth of field or to separate the face or a body from the background altogether. Identifying human faces can also be used as a step in image correction algorithms that are used to identify and correct defects in a digital image. For example, by knowing whether an object is a face or not a face, a location of eyes can be estimated and used to increase the number of true positives identified by a redeye removal algorithm and reduce the number of false positives identified by the redeye removal algorithm.

A well-known fast face-detection algorithm is disclosed in U.S. Patent Application Publication No. 2002/0102024, which is hereby incorporated by reference in its entirety for all purposes. That patent application proposes a classifier chain consisting of a series of sequential feature detectors. According to one implementation, a set of training data includes known face-containing images (which are tightly cropped around the faces therein, such that the faces dominate the images' areas), which have been labeled as such, and known face-omitting images, which also have been labeled as such. For each image in the training data, the values of various features (discussed in further detail below) within that image are observed, such that the same features for each such image are observed; in different images, different values may be observed for the same feature. A machine-learning mechanism processes the training data to learn, automatically, numerical ranges into which the values of features of known face-containing images tend to fall and outside of which the values of the corresponding features of known face-omitting images tend to fall; each different feature may be associated with a different numerical range. The machine-learning mechanism generates the classifier chain based on this processing. Each classifier in the classifier chain corresponds to a separate feature and associated numerical range. Classifiers that are more likely to filter out face-omitting images may be placed earlier in the classifier chain than classifiers that are less likely to do so.

Unlabeled images (not in the training data) are subjected successively to the classifiers in the classifier chain in order to determine whether those images probably contain faces. For a given classifier in the classifier chain, a determination is made as to whether the value observed for that classifier's corresponding feature in the unlabeled image falls within the previously machine-learned numerical range associated with that classifier's corresponding feature. As soon as an unlabeled image (or a selected portion thereof) fails to pass a particular classifier in the classifier chain (due to a value of a feature in the image falling outside of the corresponding classifier's numerical range), it is concluded that the image (or the selected portion thereof) probably does not contain a face. Subsequent classifiers in the chain do not thereafter need to be applied to the image (or the selected portion thereof). In order to increase face-detection speed, face-omitting images are eliminated from consideration as early as possible. In one implementation, an image (or a selected portion thereof) is only determined to be likely to contain a face if that image (or selected portion thereof) passes all of the classifiers in the classifier chain.

In order to process images extremely rapidly while achieving high facial feature detection rates, automated face-detection techniques may generate and use an "integral image." Generation and use of an integral image is described in "Robust Real-Time Face Detection" by Paul Viola and Michael J. Jones, in *International Journal of Computer Vision* 57(2), 137-154 (2004), which is incorporated by reference herein. An integral image is automatically generated based on a source image (e.g., an image captured by a digital camera). The integral image can be computed from the source image using a few operations per pixel. After the integral image has been computed, image features (called "Haar-like" features by Viola and Jones due to those features' conceptual relatedness to Haar Basis functions) within the corresponding source image can be detected rapidly. Based on the values of certain image features in certain regions of the source image, portions of the source image can be determined to probably represent either facial portions or non-facial portions. If a sufficient quantity of various different Haar-like feature values fall within specified ranges for those features (each such feature's value possibly being compared to a different feature-corresponding range), then it can be reasonably concluded that the area of the image in which all of those Haar-like features occur contains a face. Generation and characteristics of an integral image are discussed in greater detail below, but Haar-like features are briefly discussed first.

Viola and Jones propose the use of three different types of features: two-rectangle features, three-rectangle features, and four-rectangle features. Regarding two-rectangle features, some rectangular region of the source image is divided into two adjacent rectangles. These rectangles may be side-by-side or one on top of the other. The value of the two-rectangle feature is equal to the difference between (a) the sum of the pixel intensities within one of the rectangles and (b) the sum of the pixel intensities within the other of the rectangles. Regarding three-rectangle features, some rectangular region of the source image is divided into three rectangles of equal area; again, these may be side-by-side in a row or one above the other in a column. One of the three rectangles—the center rectangle—will be positioned between the other two outer rectangles. The value of the three-rectangle feature is equal to (a) the sum of the pixel intensities within the center rectangle minus (b) the sum of the pixel intensities within the two outer rectangles. Regarding four-rectangle features, some rectangular region of the source image is divided into four rectangular quadrants. The upper-left quadrant and the lower-right quadrant make up one diagonal quadrant pair, while the upper-right quadrant and the lower-left quadrant make up another diagonal quadrant pair. The value of the four-rectangle feature is the difference between (a) the sum of the pixel intensities within one of these diagonal quadrant pairs and (b) the sum of the pixel intensities within the other of these diagonal quadrant pairs.

The process of determining features of the source image typically involves calculating various sums of pixel intensity values within various different rectangular regions of the source image. A less effective approach for computing these sums might involve scanning all of the pixels of each such rectangular region in the source image separately for each such rectangular region. Since such rectangular regions may overlap, this approach would detrimentally involve the probable repeated scanning of certain source image pixels multiple times—once for each separate rectangular region in which that source image pixel occurred. Fortunately, after the integral image has been generated, such repetitive scanning of source image pixels can largely be avoided.

The rectangular features discussed above can be computed more rapidly using an integral image than using a source image directly. Each pixel of the integral image corresponds to a similarly located (in the same column and row) pixel in the source image, such that the integral image has the same pixel height and width as the source image. However, for each particular pixel in the integral image, the intensity value of that particular pixel is equal to the sum of the intensity values of all of the source image's pixels occurring within the rectangular region that occurs above and to the left of, and including, the particular pixel's corresponding position. For each particular pixel in the integral image, that particular pixel's corresponding rectangular region's upper-left corner is the source image's pixel at the upper-left corner of the source image, and that particular pixel's corresponding rectangular region's lower-right corner is the source image's pixel that is located, in the source image, at the same position in which the particular pixel is located in the integral image. Expressed mathematically, $$ii(x, y) = \sum_{x' \leq x, y' \leq y} i(x', y'),$$

where ii(x,y) is the integral image, and i(x,y) is the source image.

The integral image may be viewed as a two-dimensional array of intensity values in which one dimension's size is equal to the integral image's width, and in which the other dimension's size is equal to the integral image's height. For any rectangular region of the source image, the sum of the pixel intensity values in that rectangular region can be determined mathematically using just a few values from the array representation of the corresponding integral image. For example, for any given rectangular region of having an upper-left corner at position A, an upper-right corner at position B, a lower-left corner at position C, and a lower-right corner at position D, the sum of the source image's pixel intensity values in that rectangular region can be computed quickly by adding the values at positions A and D in the array to generate a first sum, adding the values at positions B and C in the array to generate a second sum, and then subtracting the second sum from the first sum.

A face-recognition algorithm may behave differently when applied to the same face under different illumination conditions. When a face is illuminated uniformly, a face-recognition algorithm may detect facial features (e.g., eyes) more correctly than when the same face is illuminated only partially—such as when one side of the face is illuminated by a light source to the side of that face, leaving the other side of the face in relative shadow. Extreme cases such as underexposure (caused by lowlight and backlight) and overexposure will decrease contrast on the face. Self-shadows caused by a directional illuminant or shadows introduced by foreign objects are more unpredictable because they can change the appearance of facial features. As is discussed above, when Haar-like features are used to detect faces within a source image, the geometric relationships and contrast information between adjacent rectangular regions are extracted. The Haar-like feature function will translate the illumination and geometric information to a numerical value. If the same Haar-like feature function is evaluated under different lighting conditions, the numerical result will be at least slightly different.

FIGS. 2A and 2B illustrate an example of the same face under two different lighting conditions. A left face 202 is uniformly illuminated, having little contrast between the left and right sides of face 202. In contrast, a right face 204 is illuminated from the right side, leaving the left side of face 204 in shadow, thus producing a high and non-uniform contrast between the left and right sides of face 204; right face 204 becomes progressively darker proceeding from the right side toward the left side. Thus, in left face 202, the difference computed between (a) the sum of pixel intensity values of rectangle 206 and (b) the sum of pixel intensity value of rectangle 208 will be relatively small; the illumination difference between rectangles 206 and 208 is mostly due to the fact that rectangle 208 contains an eye while rectangle 206 does not. In contrast, in right face 204, the difference computed between (a) the sum of pixel intensity values of rectangle 210 and (b) the sum of pixel intensity values of rectangle 212 will be relatively larger; the larger difference in illumination between rectangles 210 and 212 is due not only to the fact that rectangle 212 contains an eye while rectangle 210 does not, but also due to the fact that the rectangle 210 is generally darker than rectangle 212. This may be the reverse of the case with left face 202, in which the presence of the eye within a rectangle caused that rectangle's average pixel luminance to be darker, not lighter, than that of the rectangle adjacent to it. The values of the Haar-like features of the same face, under different lighting conditions, will be different, causing a face-detecting algorithm potentially to produce different results even though the same person's face is being evaluated in both images. Clearly, a face should be detected in both images.

Ideally, under circumstances in which the same face is being evaluated in different lighting conditions, the values of the same Haar-like features (e.g., two-rectangle features positioned over the ocular region of the face, as in FIGS. 2A and 2B), would be similar. In order to minimize the variance in Haar-like feature values that is caused by differing lighting conditions, one corrective approach divides each source image's feature value by the statistical variance of all of the pixel intensity values within the source image's entire facial region (which might, in some cases, include all of the source image's pixels). If this statistical variance is low, as would be the case with a uniformly illuminated, low contrast face such as face 202, then the division will have a relatively minor effect on the feature values. In contrast, if this statistical variance is high, as would be the case with a non-uniformly illuminated, high contrast face such as face 204, then the division will have a relatively major effect on the feature values. The division is performed both during the machine-learning procedure, relative to labeled images, and during the classifier-applying procedure, relative to unlabeled images. The division has a normalizing effect on the feature values, so that feature values in non-uniformly illuminated faces will tend to fall within the same numerical ranges as corresponding feature values in uniformly illuminated faces; without such normalization, the learned numerical ranges would probably be so broad as to reduce greatly their discriminatory ability when applied to unlabeled images.

Unfortunately, this corrective approach, involving division by statistical variance, suffers from the fact that the computation of the statistical variance of all of the pixel values within the source image's entire facial region is memory resource-expensive, processing time-consuming, and not very conducive to real-time face detection applications. This is the case even when the integral image is used to reduce the quantity of computations needed to calculate the statistical variance. The integral image itself can be viewed as an element of the process that consumes significant memory resources. The generation of the integral image can be viewed as an element of the process that consumes significant processing time.

DETAILED DESCRIPTION OF EMBODIMENTS OF THE INVENTION

Figure 1:
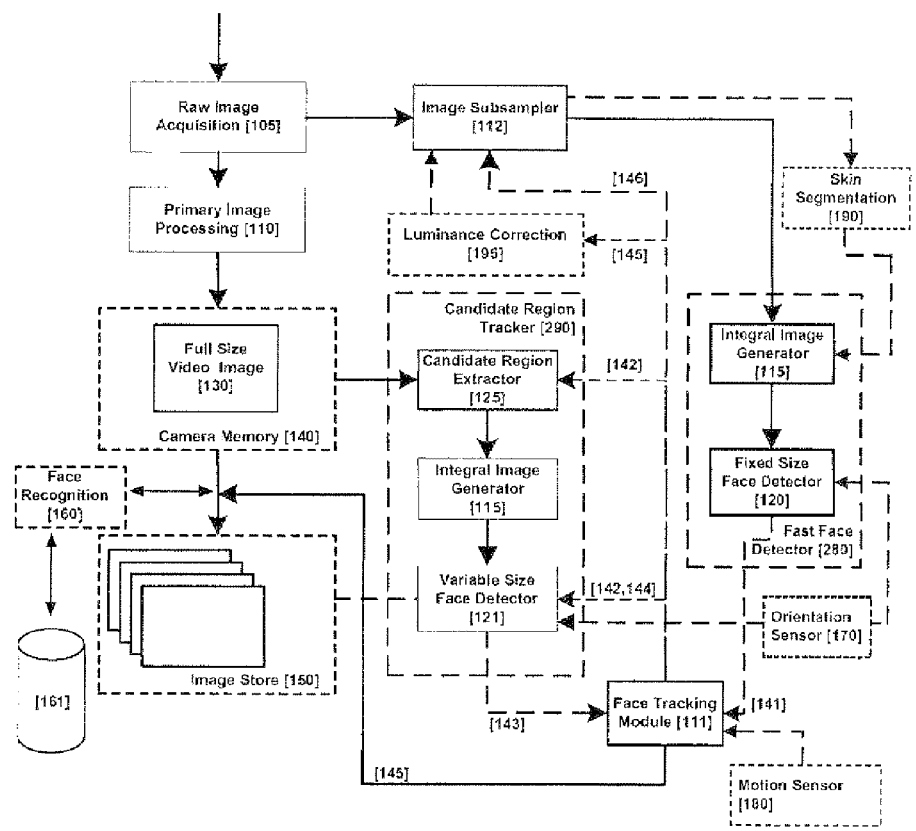
FIG. 1 shows the primary subsystems of a face tracking system in accordance with certain embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, instead of calculating a Haar-like feature value by subtracting the average pixel intensity value in one rectangular region from the average pixel intensity value in another, adjacent rectangular region, a face-detection system calculates that Haar-like feature value by dividing the average pixel intensity value in one such rectangular region by the average pixel intensity value in the other such adjacent rectangular region. Thus, in one embodiment of the invention, each Haar-like value is calculated as a ratio of average pixel intensity values rather than as a difference between such average pixel intensity values.

The feature values may be calculated using this ratio-based technique both during the machine-learning procedure, in which the numerical ranges for features in known face-containing images are learned based on labeled training data, and during the classifier-applying procedure, in which an unlabeled image's feature values are calculated and compared to the previously machine-learned numerical ranges. However, alternative techniques, such as the statistical variance-based approach discussed previously, may still be during the machine-learning procedure; such alternative techniques still will produce numerical ranges that can be mathematically adapted to work in conjunction with feature values determined using the ratio-based feature value computation techniques disclosed herein.

It has been discovered that the ratio-based computation of Haar-like feature values already produces adequate feature value normalization to compensate for differences in uniformity of illumination in face-containing images. As a result, the computation of the statistical variance of a source image's pixel intensity values is not required, and, in one embodiment of the invention, is not performed. Furthermore, the generation and storage of an integral image is unnecessary when the ratio-based feature computation technique is used. The avoidance of the generation and storage of an integral image conserves memory resources and reduces processing time during the face detection process.

Various embodiments of the invention also include a digital image acquisition system, having no photographic film, comprising means for carrying out one or more steps of the methods described in this application. Alternative embodiments of the invention include one or more machine-readable non-transitory storage media storing instructions which when executed by one or more computing devices cause the performance of one or more steps of the methods described in this application.

Before aspects of the ratio-based feature computation technique are described in detail, a system in which the ratio-based feature computation technique may be implemented and used is discussed below.

Digital Image Acquisition System

FIG. 1 shows the primary subsystems of a face tracking system in accordance with certain embodiments. The solid lines indicate the flow of image data; the dashed lines indicate control inputs or information outputs (e.g. location(s) of detected faces) from a module. In this example, an image processing apparatus can be a digital still camera (DSC), a video camera, a cell phone equipped with an image capturing mechanism or a hand help computer equipped with an internal or external camera, or a combination thereof.

A digital image, i(x, y), is acquired in raw format from an image sensor 105 such as a charged coupled device (CCD) sensor or complimentary metal oxide semiconductor (CMOS) sensor. An image subsampler 112 generates a smaller copy of the main image. Most digital cameras already contain dedicated hardware subsystems to perform image subsampling, for example to provide preview images to a camera display. Typically, the subsampled image is provided in bitmap format (RGB or YCC). In the meantime, the normal image acquisition chain performs post-processing on the raw image 110 which typically includes some luminance and color balancing. In certain digital imaging systems, the subsampling may occur after such post-processing, or after certain post-processing filters are applied, but before the entire post-processing filter chain is completed.

Optionally, the subsampled image may be passed to an integral image generator 115 which creates an integral image from the subsampled image. The integral image, ii(x,y), at location (x, y) contains the sum of the pixel values above and to the left of point (x, y) from image i(x,y). However, in at least some embodiments of the invention, no integral image is generated or stored, and the subsampled image is passed to the next component instead. In embodiments in which the integral image is not generated, integral image generator 115 may be omitted from the system.

This integral image, if generated (or the subsampled image, if the integral image is not generated) is next passed to a fixed size face detector 120. If the integral image is generated, then the face detector is applied to the full integral image, but as this is an integral image of a subsampled copy of the main image, the processing involved in the face detection is proportionately reduced. If the subsampled image is ¼ of the main image, e.g., has ¼ the number of pixels and/or ¼ the size, then the processing time involved is only about 25% of that for the full image. Alternatively, the face detector may be applied to the subsampled image under circumstances in which the integral image is not generated.

This approach is particularly amenable to hardware embodiments where the subsampled image memory space can be scanned by a fixed size direct memory access (DMA) window and digital logic to implement a Haar-feature classifier chain can be applied to this DMA window. Several sizes of classifiers may alternatively be used (in a software embodiment), or multiple fixed-size classifiers may be used (in a hardware embodiment).

After application of the fast face detector 280, any newly detected candidate face regions 141 are passed onto a face tracking module 111, where any face regions confirmed from previous analysis 145 may be merged with new candidate face regions prior to being provided 142 to a face tracker 290.

The face tracker 290 provides a set of confirmed candidate regions 143 back to the tracking module 111. Additional image processing filters are preferably applied by the tracking module 111 to confirm either that these confirmed regions 143 are face regions or to maintain regions as candidates if they have not been confirmed as such by the face tracker 290. A final set of face regions 145 can be output by the module 111 for use elsewhere in the camera or to be stored within or in association with an acquired image for later processing either within the camera or offline. Set 145 can also be used in a next iteration of face tracking.

After the main image acquisition chain is completed, a full-size copy of the main image 130 will normally reside in the system memory 140 of the image acquisition system. This may be accessed by a candidate region extractor 125 component of the face tracker 290, which selects image patches based on candidate face region data 142 obtained from the face tracking module 111. In one embodiment of the invention, these image patches for each candidate region are optionally passed to an integral image generator 115, which passes the resulting integral images to a variable sized detector 121—as one possible example a Viola-Jones detector—which then applies a classifier chain—preferably at least a 32-classifier chain—to the integral image (or subsampled image) for each candidate region across a range of different scales.

The range of scales 144 employed by the face detector 121 is determined and supplied by the face tracking module 111 and is based partly on statistical information relating to the history of the current candidate face regions 142 and partly on external metadata determined from other subsystems within the image acquisition system.

As an example of the former, if a candidate face region has remained consistently at a particular size for a certain number of acquired image frames, then the face detector 121 is applied at this particular scale and/or perhaps at one scale higher (i.e. 1.25 times larger) and one scale lower (i.e. 1.25 times lower).

As an example of the latter, if the focus of the image acquisition system has moved to approximately infinity, then the smallest scalings will be applied in the face detector 121. Normally these scalings would not be employed, as they would be applied a greater number of times to the candidate face region in order to cover it completely. It is worthwhile noting that the candidate face region will have a minimum size beyond which it should not decrease—this is in order to allow for localized movement of the camera by a user between frames. In some image acquisition systems which contain motion sensors, such localized movements may be tracked. This information may be employed to further improve the selection of scales and the size of candidate regions.

The candidate region tracker 290 provides a set of confirmed face regions 143 based on full variable size face detection of the image patches to the face tracking module 111. Clearly, some candidate regions will have been confirmed while others will have been rejected, and these can be explicitly returned by the tracker 290 or can be calculated by the tracking module 111 by analyzing the difference between the confirmed regions 143 and the candidate regions 142. In either case, the face tracking module 111 can then apply alternative tests to candidate regions rejected by the tracker 290 to determine whether these should be maintained as candidate regions 142 for the next cycle of tracking or whether these should indeed be removed from tracking.

Once the set of confirmed candidate regions 145 has been determined by the face tracking module 111, the module 111 communicates with the sub-sampler 112 to determine when the next acquired image is to be sub-sampled, and so provided to the detector 280, and also to provide the resolution 146 at which the next acquired image is to be sub-sampled.

Where the detector 280 does not run when the next image is acquired, the candidate regions 142 provided to the extractor 125 for the next acquired image will be the regions 145 confirmed by the tracking module 111 from the last acquired image. On the other hand, when the face detector 280 provides a new set of candidate regions 141 to the face tracking module 111, these candidate regions are preferably merged with the previous set of confirmed regions 145 to provide the set of candidate regions 142 to the extractor 125 for the next acquired image.

Zoom information may be obtained from camera firmware. Using software techniques which analyze images in camera memory 140 or image store 150, the degree of pan or tilt of the camera may be determined from one image to another.

In one embodiment, the acquisition device is provided with a motion sensor 180, as illustrated at FIG. 1, to determine the degree and direction of pan from one image to another, and avoiding the processing involved in determining camera movement in software.

Such motion sensor for a digital camera may be based on an accelerometer, and may be optionally based on gyroscopic principals within the camera, primarily for the purposes of warning or compensating for hand shake during main image capture. U.S. Pat. No. 4,448,510, to Murakoshi, which is hereby incorporated by reference, discloses such a system for a conventional camera, and U.S. Pat. No. 6,747,690, to Molgaard, which is also incorporated by reference, discloses accelerometer sensors applied within a modern digital camera.

Where a motion sensor is incorporated in a camera, it may be optimized for small movements around the optical axis. The accelerometer may incorporate a sensing module which generates a signal based on the acceleration experienced and an amplifier module which determines the range of accelerations which can effectively be measured. The accelerometer may allow software control of the amplifier stage which allows the sensitivity to be adjusted.

The motion sensor 180 could equally be implemented with MEMS sensors of the sort which will be incorporated in next generation consumer cameras and camera-phones.

In any case, when the camera is operable in face tracking mode, i.e., constant video acquisition as distinct from acquiring a main image, shake compensation would typically not be used because image quality is lower. This provides the opportunity to configure the motion sensor 180 to sense large movements by setting the motion sensor amplifier module to low gain. The size and direction of movement detected by the sensor 180 is preferably provided to the face tracker 111. The approximate size of faces being tracked is already known, and this enables an estimate of the distance of each face from the camera. Accordingly, knowing the approximate size of the large movement from the sensor 180 allows the approximate displacement of each candidate face region to be determined, even if they are at differing distances from the camera.

Thus, when a large movement is detected, the face tracker 111 shifts the locations of candidate regions as a function of the direction and size of the movement. Alternatively, the size of the region over which the tracking algorithms are applied may also be enlarged (and the sophistication of the tracker may be decreased to compensate for scanning a larger image area) as a function of the direction and size of the movement.

When the camera is actuated to capture a main image, or when it exits face tracking mode for any other reason, the amplifier gain of the motion sensor 180 is returned to normal, allowing the main image acquisition chain 105, 110 for full-sized images to employ normal shake compensation algorithms based on information from the motion sensor 180.

An alternative way of limiting the areas of an image to which the face detector 120 is to be applied involves identifying areas of the image which include skin tones. U.S. Pat. No. 6,661,907, which is hereby incorporated by reference, discloses one such technique for detecting skin tones and subsequently only applying face detection in regions having a predominant skin color.

In one embodiment, skin segmentation 190 is preferably applied to a sub-sampled version of the acquired image. If the resolution of the sub-sampled version is not sufficient, then a previous image stored in image store 150 or a next sub-sampled image can be used as long as the two images are not too different in content from the current acquired image. Alternatively, skin segmentation 190 can be applied to the full size video image 130.

In any case, regions containing skin tones are identified by bounding rectangles. In one embodiment of the invention, the bounding rectangles are optionally provided to the integral image generator 115, which produces integral image patches corresponding to the rectangles in a manner similar to that used by the tracker integral image generator 115.

Not only does this approach reduce the processing overhead associated with face detection, but in one embodiment of the invention, it also allows the face detector 120 to apply more relaxed face detection to the bounding rectangles, as there is a higher chance that these skin-tone regions do in fact contain a face. So, for a Viola-Jones detector 120, a shorter classifier chain can be employed to more effectively provide similar quality results to running face detection over the whole image with longer Viola-Jones classifiers required to positively detect a face.

Further improvements to face detection are also contemplated in other embodiments. For example, based on the fact that face detection can be very dependent on illumination conditions, such that small variations in illumination can cause face detection to fail and cause somewhat unstable detection behavior, in another embodiment, confirmed face regions 145 are used to identify regions of a subsequently acquired sub-sampled image on which luminance correction may be performed to bring regions of interest of the image to be analyzed to the desired parameters. One example of such correction is to improve the luminance contrast within the regions of the sub-sampled image defined by confirmed face regions 145.

Contrast enhancement may be used to increase local contrast of an image, especially when the usable data of the image is represented by close contrast values. Through this adjustment, intensities of pixels of a region when represented on a histogram, which would otherwise be closely distributed, can be better distributed. This allows for areas of lower local contrast to gain a higher contrast without affecting global contrast. Histogram equalization accomplishes this by effectively spreading out the most frequent intensity values.

The method is useful in images with backgrounds and foregrounds that are both bright or both dark. In particular, the method can lead to better detail in photographs that are over-exposed or under-exposed.

Alternatively, this luminance correction can be included in the computation of an "adjusted" integral image in the generators 115. However, in one embodiment of the invention, no integral image is generated or stored.

In another improvement, when face detection is being used, the camera application is set to dynamically modify the exposure from the computed default to a higher values (from frame to frame, slightly overexposing the scene) until the face detection provides a lock onto a face.

Further embodiments providing improved efficiency for the system described above are also contemplated. For example, face detection algorithms typically employ methods or use classifiers to detect faces in a picture at different orientations: 0, 90, 180 and 270 degrees. The camera may be equipped with an orientation sensor 170, as illustrated at FIG. 1. This can include a hardware sensor for determining whether the camera is being held upright, inverted or tilted clockwise or counter-clockwise. Alternatively, the orientation sensor can comprise an image analysis module connected either to the image acquisition hardware 105, 110 or camera memory 140 or image store 150 for quickly determining whether images are being acquired in portrait or landscape mode and whether the camera is tilted clockwise or counter-clockwise.

Once this determination is made, the camera orientation can be fed to one or both of the face detectors 120, 121. The detectors may apply face detection according to the likely orientation of faces in an image acquired with the determined camera orientation. This feature can either significantly reduce the face detection processing overhead, for example, by avoiding the employment of classifiers which are unlikely to detect faces, or increase its accuracy by running classifiers more likely to detects faces in a given orientation more often.

Example Ratio-Based Feature Value Computation Technique

Figure 3:
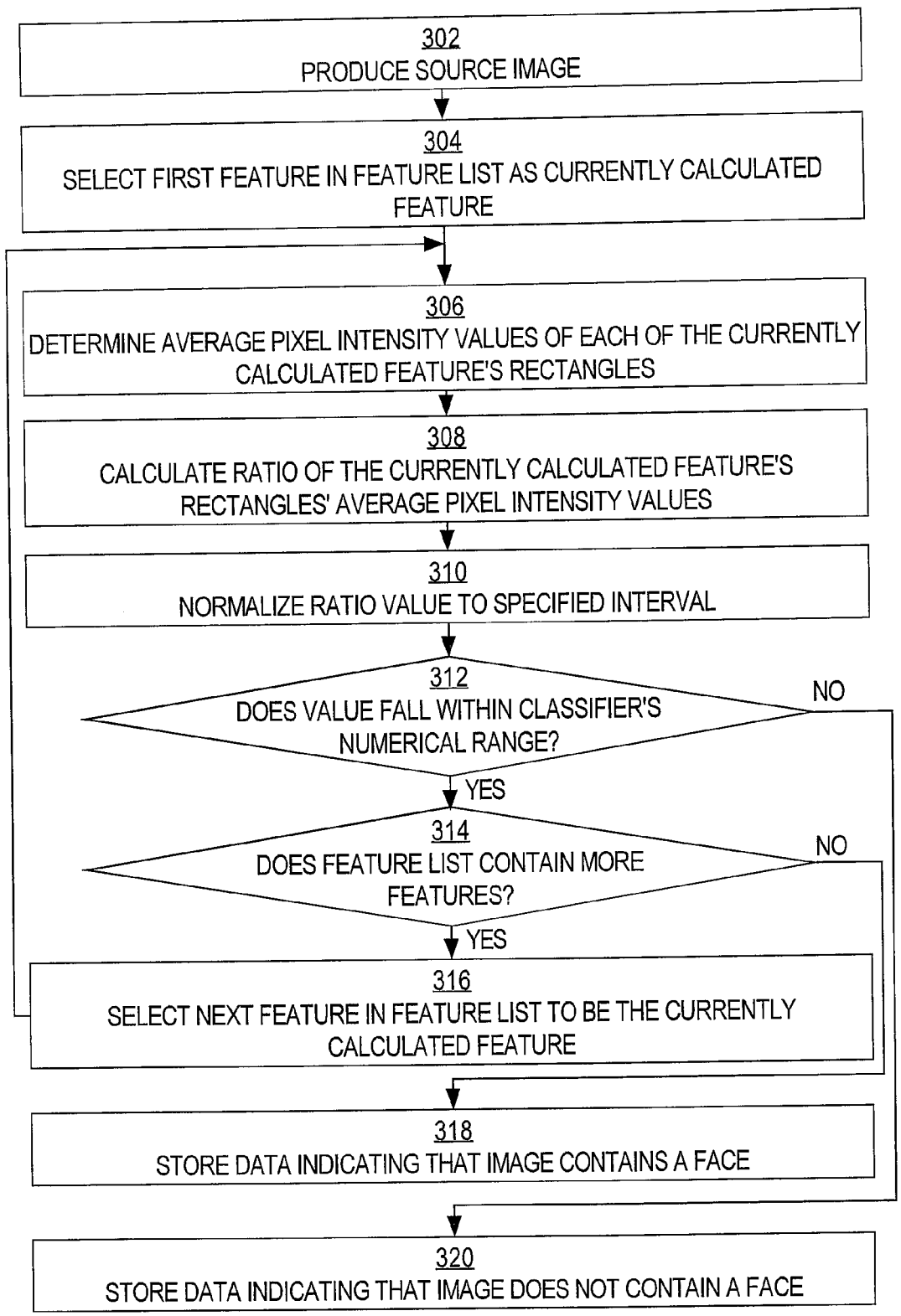
FIG. 3 is a flow diagram that illustrates an example of a ratio-based Haar-like feature value computation technique, according to an embodiment of the invention.

FIG. 3 is a flow diagram that illustrates an example of a ratio-based Haar-like feature value computation technique, according to an embodiment of the invention. Alternative embodiments of the invention may involve fewer, more, or different steps than those illustrated in FIG. 3. The technique illustrated in FIG. 3 begins with the assumption that a machine-learning mechanism has already evaluated a set of training data and automatically determined, for each Haar-like feature in a set of Haar-like features, a normalized numerical range corresponding to that feature; thus, the illustrated technique involves the determination of whether an unlabeled image's feature values, calculated based on ratios, fall within those numerical ranges. Additional optional enhancements to the technique illustrated in FIG. 3 will be described afterward.

In block 302, a source image is produced. For example, a digital camera may capture an image through a system of lenses and sensors. The digital camera may store this image in memory as an array of pixels. Each such pixel may have a set of hue component values, such as red, green, and blue values, and an intensity value which generally indicates the brightness of that pixel regardless of its hue.

Figure 2B:
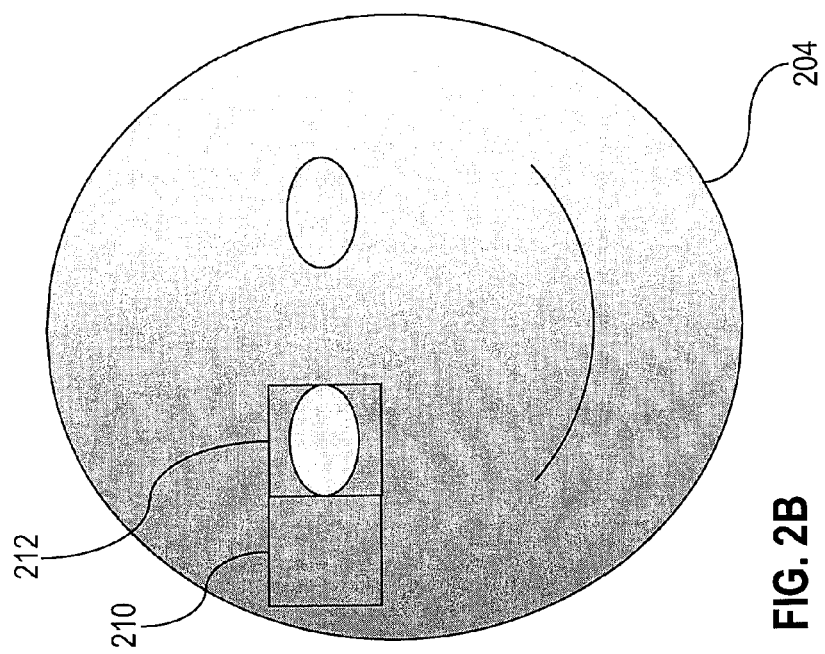
FIGS. 2A and 2B illustrate an example of the same face under two different lighting conditions.
Figure 2A:
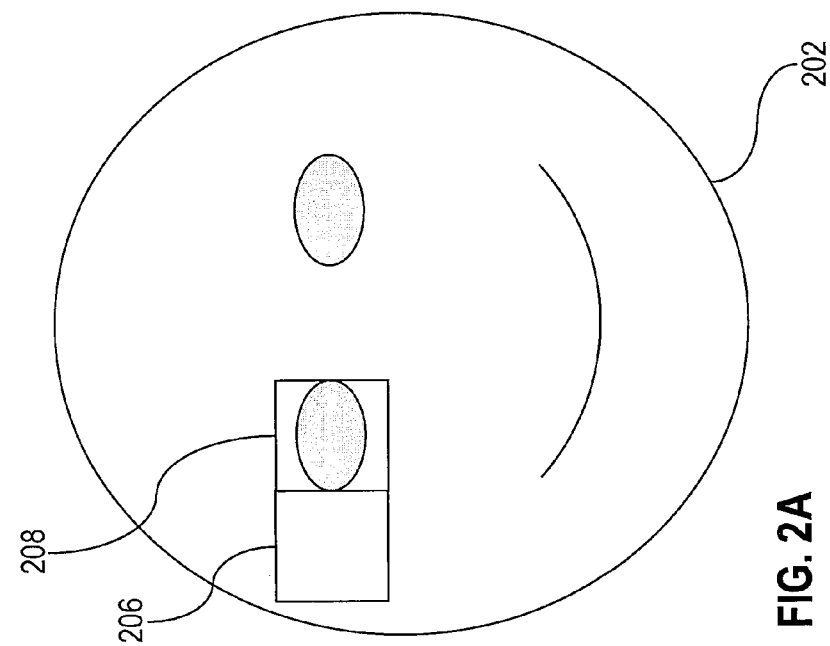

In block 304, a first Haar-like feature in a list of Haar-like features is selected to be the currently calculated feature. For example, the first Haar-like feature might be the two-rectangle feature shown as adjacent rectangles 206 and 208 in FIG. 2A. This is the first feature of several features for which values will be determined. Other features in the list of features may include adjacent rectangles of different quantities, sizes, dimensions, and positions within the source image. The features in the list may be ordered based on the order in which classifiers corresponding to those features occur in the previously generated classifier chain, such that the first feature in the list is the feature that is evaluated by the first classifier in the classifier chain, and so on. The quantity of features in the list may correspond to the quantity of classifiers in the classifier chain.

In block 306, the average pixel intensity values of each of the currently calculated feature's rectangles are determined. In one embodiment of the invention, such a rectangle's average pixel intensity value is calculated by summing the intensity values of each of the source image's pixels that occurs within that rectangle, and then dividing that sum by the quantity of those pixels contained within the rectangle. In an alternative embodiment of the invention, a rectangle's average pixel intensity value may be calculated based on an integral image that was generated for the source image; however, in one embodiment of the invention, no integral image is generated or stored. The number of average pixel intensity values calculated in block 306 depends on the quantity of rectangles in the currently calculated feature. For example, the currently calculated feature might be a two-rectangle, three-rectangle, or four-rectangle feature.

In block 308, a ratio of the average intensity values determined in block 306 is calculated. If the currently calculated feature is a two-rectangle feature, then the ratio is determined by dividing the average pixel intensity value of one of the feature's rectangles (e.g., the left rectangle) by the average pixel intensity value of the other of the feature's rectangles (e.g., the right rectangle). If the currently calculated feature is a three-rectangle feature, then the ratio is determined by dividing the average pixel intensity value of the feature's center rectangle by the sum of the average pixel intensity values of the feature's two outer rectangles. If the currently calculated feature is a four-rectangle feature, then the ratio is determined by dividing (a) the sum of one of the feature's quadrant pairs' (e.g., the quadrant pair consisting of the feature's upper-left and lower-right rectangles) average pixel intensity values by (b) the sum of the other of the feature's quadrant pairs' (e.g., the quadrant pair consisting of the feature's upper-right and lower-left rectangles) average pixel intensity values.

In one embodiment of the invention, the ratio is calculated by dividing one average pixel intensity value (or sum of two such values) by another average pixel intensity value (or sum of two such values). However, in an alternative embodiment of the invention which will be described further below, the ratio is instead calculated by multiplying one average pixel intensity value by a reciprocal value located in a pre-generated look-up table.

In block 310, the result of the ratio calculated in block 308 is normalized mathematically. For example, the value produced by the ratio's division may be normalized such that the value lies somewhere within the range of 0 to 64. This may be accomplished, for example, by multiplying the value (which will be some number between 0 and 1) by 64. This normalized value essentially is the currently calculated feature's value.

In block 312, a determination is made as to whether the normalized value calculated in block 310 falls within a numerical range that is specified by the classifier that corresponds to (and is designed to evaluate) the currently calculated feature's value. If the normalized value falls within the classifier's numerical range (thus indicating that the source image passes that classifier), then control passes to block 314. Otherwise, the normalized value falls outside of the classifier's numerical range (thus indicating that the source image fails that classifier), and control passes to block 320.

In block 314, a determination is made as to whether the list of features (discussed above in connection with block 304) contains any further features that have not yet been selected to be the currently calculated feature. If the list contains at least one more feature that has not yet been selected to be the currently calculated feature, then control passes to block 316. Otherwise, all of the features in the list have been selected to the currently calculated feature at one time or another, and control passes to block 318.

In block 316, the next feature in the ordered list of features, which has not yet been selected to be the currently calculated feature, is selected to be the currently calculated feature. Control passes back to block 306.

Alternatively, in block 318, a determination is made that the source image contains a face. Further operations appropriate to this determination, such as the display, on the digital camera's liquid crystal display (LCD), of a bounding box around the portion of the source image that contains the face, may be performed in response to this determination. Additionally, data, which indicates that the source image contains a face, may be stored in the digital camera's memory. Under such circumstances, the ratio-based feature calculation technique is completed.

Alternatively, in block 320, a determination is made that the source image does not contain a face. Further operations appropriate to this determination may be performed in response to this determination. For example, data, which indicates that the source image does not contain a face, may be stored in the digital camera's memory. Under such circumstances, the ratio-based feature calculation technique is completed.

Avoiding Division in Ratio Calcultion Using a Look-Up Table

When performed by a computer, division is typically a more resource-consuming operation than multiplication is. As is discussed above in connection with block 308, in an alternative embodiment of the invention, the ratio of a feature's rectangles' average pixel intensity values is instead calculated by multiplying one average pixel intensity value by a reciprocal value located in a pre-generated look-up table. In such an alternative embodiment of the invention, the real-time (i.e., post-image capture) division of such rectangles' average pixel intensity values is avoided in the calculation of the ratio.

In one embodiment of the invention, a look-up table, which correlates discrete values (e.g., integer values) within a specified range (e.g., 0 to 255) to associated reciprocal values, is generated and stored. The look-up table only needs to be generated and stored once, but can be used multiple times.

In at least some digital systems, pixel intensity values are integer values that fall within the range of 0 to 255. In such digital systems, the average pixel intensity value of any of a feature's rectangles necessarily also will fall within this range of 0 to 255; an average cannot be higher than the highest value or lower than the lowest value. In one embodiment of the invention, for each key integer value between 1 and 255, inclusive, the look-up table contains an entry that associates that key integer value with a reciprocal value that is equal to $2^{19}$ divided by that key integer value. Thus, the entry for the key integer value 1 is associated with a reciprocal value of 524288 ($2^{19}/1$), while the entry for the key integer value 255 is associated with a reciprocal value of approximately 2056 ($2^{19}/255$). The entry for the key integer value 0 associates that key integer value with the reciprocal value 524288 ($2^{19}/1$), since division by zero is undefined.

In one embodiment of the invention, whenever a ratio of two average pixel intensity values later needs to be calculated, instead of dividing one such value by the other, the first average pixel intensity value is multiplied by the reciprocal value that is associated, in the look-up table, with the key integer value to which the second average pixel intensity value is closest (for purposes of simplicity, truncation of any decimal part of the second average may be performed to determine the key integer value to look up in the look-up table). The product of the multiplication, which will be a value in the range of 0 to $2^{20}$, then may be normalized to be somewhere with the range of 0 to 64, as is discussed above in connection with block 310. This normalized value essentially is the currently calculated feature's value.

Hardware Overview

According to one embodiment, the techniques described herein are implemented by one or more special-purpose computing devices. The special-purpose computing devices can be incorporated into the digital image acquisition device described in FIG. 1 or might be separate from the digital image acquisition described in FIG. 1.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
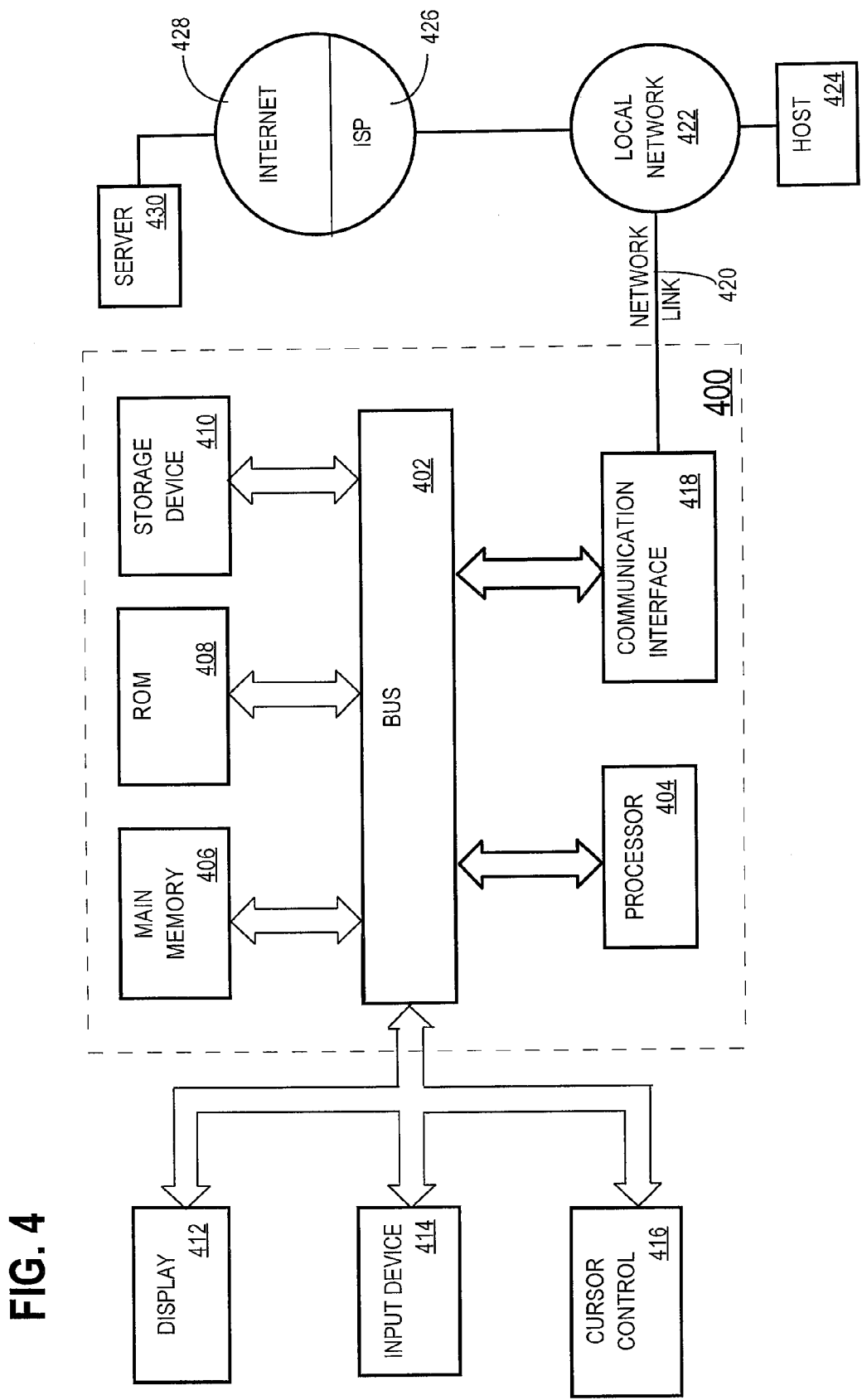
FIG. 4 shows a block diagram of a special purpose computing device for carrying out techniques of the present invention.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile, non-transitory media includes, for example, optical or magnetic disks, such as storage device 410. Volatile media includes dynamic memory, such as main memory 406. Common forms of non-transitory storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Non-transitory storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Extensions and Alternatives

In this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

All references cited above herein, in addition to the background and summary of the invention sections, are hereby incorporated by reference into the detailed description of the embodiments as disclosing alternative embodiments and components, and details relating to certain embodiments. The following are also incorporated by reference for these purposes: U.S. patent application Ser. Nos. 12/479,593; 12/362, 399; 12/116,140; 12/354,707; 12/042,104; 11/761,647; 11/554,539; 11/464,083; 11/027,001; 10/842,244; 11/024, 046; 11/233,513; 11/460,218; 11/573,713; 11/319,766; 11/464,083; 11/744,020; 11/767,412; 10/763,801; 11/573, 713; 12/042,104; 11/859,164; 12/026,484; 11/861,854; and 11/460,218; and U.S. Published Patent Applications Nos. 2008/0013798; 2008/0031498; 2006/0285754; 2006/ 0140455; 2006/0120599; 2006/0039690; 2008/0285754; 2007/0189748; 2007/0269108; 2008/0175481; and 2005/ 0068452; and U.S. Pat. Nos. 7,551,755; 7,551,754; 7,471, 846; 7,469,055; 7,474,341; 7,466,866; 7,515,740; 7,315,631; 7,403,643; 7,460,694; and 7,460,695.

What is claimed is:

1. A method for determining whether a portion of an image contains a face, comprising:
   determining a first value for a first region of an image, wherein the first region is within a particular portion of the image;
   determining a second value for a second region of the image, wherein the second region is within the particular portion of the image and is adjacent to the first region;
   generating a first feature value for a first feature, wherein generating the first feature value comprises determining a first ratio based at least in part upon the first value for the first region and the second value for the second region;
   obtaining a first value range that is associated with the first feature, wherein first feature values within the first value range indicate a likelihood that a face is present;
   determining whether the first feature value falls within the first value range;
   in response to determining that the first feature value does not fall within the first value range, storing data that indicates that the particular portion of the image does not contain a face;

in response to determining that the first feature value does fall within the first value range:

determining a third value for a third region of the image, wherein the third region is within the particular portion of the image;

determining a fourth value for a fourth region of the image, wherein the fourth region is within the particular portion of the image and is adjacent to the third region;

generating a second feature value for a second feature, wherein generating the second feature value comprises:

determining a second ratio by dividing a first sum of a first subset of more than two region values computed for the image by a second sum of a second subset of the more than two region values computed for the image, wherein the first subset of the more than two region values is computed for different regions of the image than the second subset of the more than two region values is computed for and;

determining the second feature value based on the second ratio;

obtaining a second value range that is associated with the second feature, wherein the second value range is different from the first value range, and wherein second feature values within the second value range indicate a likelihood that a face is present;

determining whether the second feature value falls within the second value range; and in response to determining that the second feature value does not fall within the second value range, storing data that indicates that the particular portion of the image does not contain a face;

wherein the method is performed by one or more computing devices.

2. The method of claim 1, wherein the first feature and the second feature are Haar-like features.

3. The method of claim 1, wherein the first and second regions are rectangular regions, and wherein the first ratio is the ratio between the first value and the second value.

4. The method of claim 3, wherein the first value is a first pixel intensity value that is derived based upon pixel intensity values of two or more pixels within the first region, and wherein the second value is a second pixel intensity value that is derived based upon pixel intensity values of two or more pixels within the second region.

5. The method of claim 3, wherein determining the first ratio comprises:

accessing a look-up table that contains reciprocal values;
  obtaining from the look-up table a reciprocal value for the second value; and
  multiplying the first value by the reciprocal value for the second value.

6. The method of claim 1,
wherein the first and second regions are rectangular regions;
wherein the method further comprises:
  determining a fifth value for a fifth region of the image, wherein the fifth region is a rectangular region that is within the particular portion of the image and that is adjacent to the second region; and
wherein the first ratio is the ratio between the second value and the sum of the first and fifth values.

7. The method of claim 1,
wherein the first and second regions are rectangular regions;
wherein the method further comprises:
  determining a fifth value for a fifth region of the image, wherein the fifth region is a rectangular region that is within the particular portion of the image and that is adjacent to the first region;
  determining a sixth value for a sixth region of the image, wherein the sixth region is a rectangular region that is within the particular portion of the image and that is adjacent to the fifth and second regions; and
wherein the first ratio is the ratio between the sum of the first and sixth values and the sum of the second and fifth values.

8. The method of claim 1, wherein the image is a source image, and wherein the first and second feature values are generated without using an integral image generated from the source image.

9. The method of claim 1, wherein the first and second feature values are generated without using a statistical variance parameter that reflects variance of pixel intensity values in the image.

10. A non-transitory computer readable storage medium storing instructions which, when executed by or more processors, cause the one or more processors to perform operations comprising:

determining a first value for a first region of an image, wherein the first region is within a particular portion of the image;

determining a second value for a second region of the image, wherein the second region is within the particular portion of the image and is adjacent to the first region;

generating a first feature value for a first feature, wherein generating the first feature value comprises determining a first ratio based at least in part upon the first value for the first region and the second value for the second region;

obtaining a first value range that is associated with the first feature, wherein first feature values within the first value range indicate a likelihood that a face is present;

determining whether the first feature value falls within the first value range;

in response to determining that the first feature value does not fall within the first value range, storing data that indicates that the particular portion of the image does not contain a face;

in response to determining that the first feature value does fall within the first value range:

determining a third value for a third region of the image, wherein the third region is within the particular portion of the image;

determining a fourth value for a fourth region of the image, wherein the fourth region is within the particular portion of the image and is adjacent to the third region;

generating a second feature value for a second feature, wherein generating the second feature value comprises:

determining a second ratio by dividing a first sum of a first subset of more than two region values computed for the image by a second sum of a second subset of the more than two region values computed for the image, wherein the first subset of the more than two region values is computed for different regions of the image than the second subset of the more than two region values is computed for and;

determining the second feature value based on the second ratio;

obtaining a second value range that is associated with the second feature, wherein the second value range is different from the first value range, and wherein second feature values within the second value range indicate a likelihood that a face is present;

determining whether the second feature value falls within the second value range; and in response to determining that the second feature value does not fall within the second value range, storing data that indicates that the particular portion of the image does not contain a face.

11. The non-transitory computer readable storage medium of claim 10, wherein the first feature and the second feature are Haar-like features.

12. The non-transitory computer readable storage medium of claim 10, wherein the first and second regions are rectangular regions, and wherein the first ratio is the ratio between the first value and the second value.

13. The non-transitory computer readable storage medium of claim 12, wherein the first value is a first pixel intensity value that is derived based upon pixel intensity values of two or more pixels within the first region, and wherein the second value is a second pixel intensity value that is derived based upon pixel intensity values of two or more pixels within the second region.

14. The non-transitory computer readable storage medium of claim 12, wherein determining the first ratio comprises:
accessing a look-up table that contains reciprocal values;
obtaining from the look-up table a reciprocal value for the second value; and
multiplying the first value by the reciprocal value for the second value.

15. The non-transitory computer readable storage medium of claim 10,
wherein the first and second regions are rectangular regions;
wherein the instructions cause the one or more processors to further perform:
determining a fifth value for a fifth region of the image, wherein the fifth region is a rectangular region that is within the particular portion of the image and that is adjacent to the second region; and
wherein the first ratio is the ratio between the second value and the sum of the first and fifth values.

16. The non-transitory computer readable storage medium of claim 10,
wherein the first and second regions are rectangular regions;
wherein the instructions cause the one or more processors to further perform:
determining a fifth value for a fifth region of the image, wherein the fifth region is a rectangular region that is within the particular portion of the image and that is adjacent to the first region;
determining a sixth value for a sixth region of the image, wherein the sixth region is a rectangular region that is within the particular portion of the image and that is adjacent to the fifth and second regions; and
wherein the first ratio is the ratio between the sum of the first and sixth values and the sum of the second and fifth values.

17. The non-transitory computer readable storage medium of claim 10, wherein the image is a source image, and wherein the first and second feature values are generated without using an integral image generated from the source image.

18. The non-transitory computer readable storage medium of claim 10, wherein the first and second feature values are generated without using a statistical variance parameter that reflects variance of pixel intensity values in the image.

19. A device comprising:
one or more storages capable of storing one or more images and other data; and
a face detector configured to perform operations comprising:
accessing an image stored in the one or more storages;
determining a first value for a first region of the image, wherein the first region is within a particular portion of the image;
determining a second value for a second region of the image, wherein the second region is within the particular portion of the image and is adjacent to the first region;
generating a first feature value for a first feature, wherein generating the first feature value comprises determining a first ratio based at least in part upon the first value for the first region and the second value for the second region;
obtaining from the one or more storages a first value range that is associated with the first feature, wherein first feature values within the first value range indicate a likelihood that a face is present;
determining whether the first feature value falls within the first value range;
in response to determining that the first feature value does not fall within the first value range, storing data into the one or more storages that indicates that the particular portion of the image does not contain a face;
in response to determining that the first feature value does fall within the first value range:
determining a third value for a third region of the image, wherein the third region is within the particular portion of the image;
determining a fourth value for a fourth region of the image, wherein the fourth region is within the particular portion of the image and is adjacent to the third region;
generating a second feature value for a second feature, wherein generating the second feature value comprises:
determining a second ratio by dividing a first sum of a first subset of more than two region values computed for the image by a second sum of a second subset of the more than two region values computed for the image, wherein the first subset of the more than two region values is computed for different regions of the image than the second subset of the more than two region values is computed for and;
determining the second feature value based on the second ratio;
obtaining from the one or more storages a second value range that is associated with the second feature, wherein the second value range is different from the first value range, and wherein second feature values within the second value range indicate a likelihood that a face is present;
determining whether the second feature value falls within the second value range; and in response to determining that the second feature value does not fall within the second value range, storing data into the one or more storages that indicates that the particular portion of the image does not contain a face.

20. The device of claim 19, wherein the first feature and the second feature are Haar-like features.

21. The device of claim 19, wherein the first and second regions are rectangular regions, and wherein the first ratio is the ratio between the first value and the second value.

22. The device of claim 21, wherein the first value is a first pixel intensity value that is derived based upon pixel intensity values of two or more pixels within the first region, and wherein the second value is a second pixel intensity value that is derived based upon pixel intensity values of two or more pixels within the second region.

23. The device of claim 21, wherein determining the first ratio comprises:
   accessing from the one or more storages a look-up table that contains reciprocal values;
   obtaining from the look-up table a reciprocal value for the second value; and
   multiplying the first value by the reciprocal value for the second value.

24. The device of claim 19,
   wherein the first and second regions are rectangular regions;
   wherein the face detector is configured to further perform:
      determining a fifth value for a fifth region of the image, wherein the fifth region is a rectangular region that is within the particular portion of the image and that is adjacent to the second region; and
      wherein the first ratio is the ratio between the second value and the sum of the first and fifth values.

25. The device of claim 19,
   wherein the first and second regions are rectangular regions;
   wherein the face detector is configured to further perform:
      determining a fifth value for a fifth region of the image, wherein the fifth region is a rectangular region that is within the particular portion of the image and that is adjacent to the first region;
      determining a sixth value for a sixth region of the image, wherein the sixth region is a rectangular region that is within the particular portion of the image and that is adjacent to the fifth and second regions; and
      wherein the first ratio is the ratio between the sum of the first and sixth values and the sum of the second and fifth values.

26. The device of claim 19, wherein the image is a source image, and wherein the first and second feature values are generated without using an integral image generated from the source image.

27. The device of claim 19, wherein the first and second feature values are generated without using a statistical variance parameter that reflects variance of pixel intensity values in the image.

28. The device of claim 19, wherein the device is a digital camera, and wherein the device further comprises an image capturing apparatus for capturing one or more images and storing the one or more images in the one or more storages.

* * * * *